J. HUBBARD.
Mill Spindle.
No. 1,538.
Patented April 8, 1840.
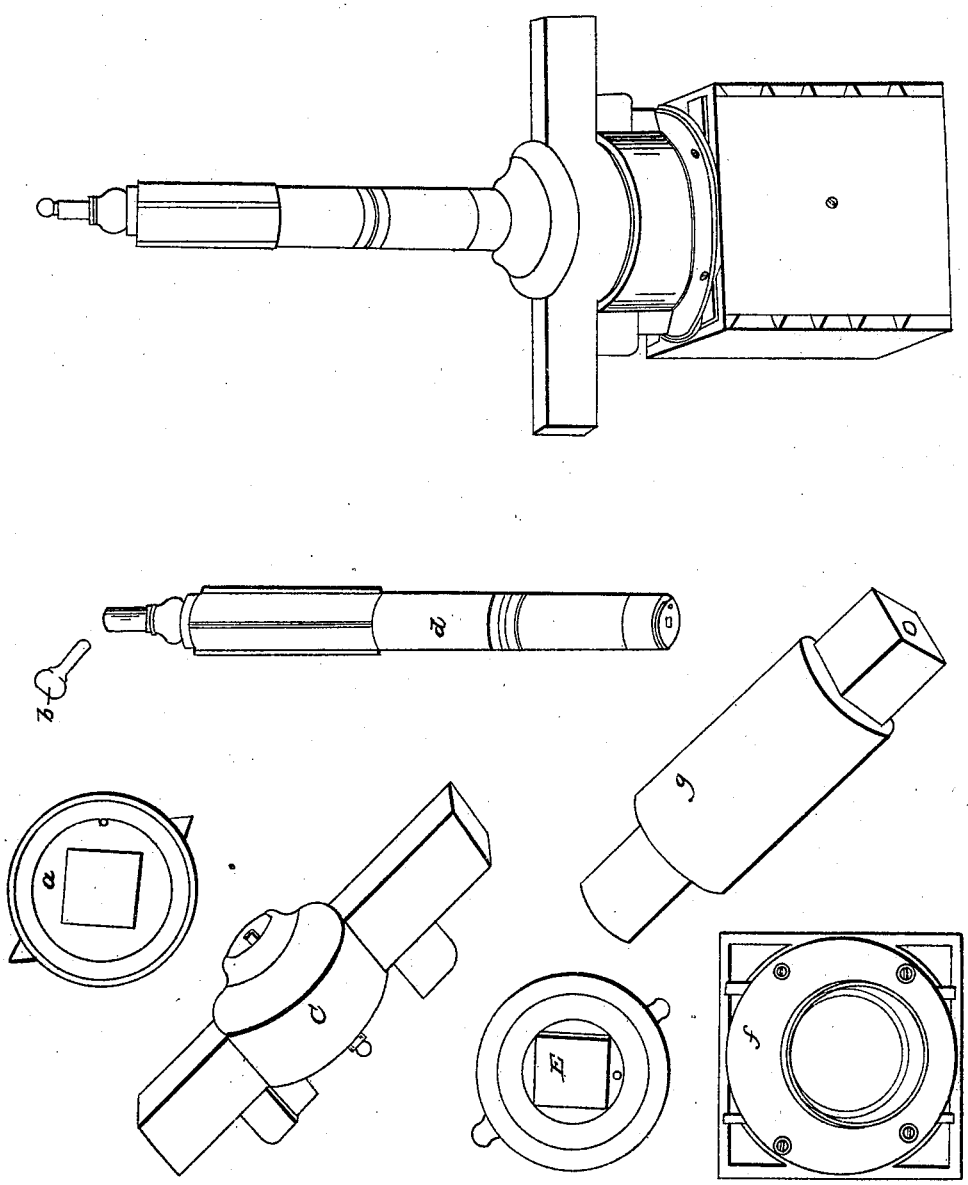

UNITED STATES PATENT OFFICE.

JESSE HUBBARD, OF WATERTOWN, CONNECTICUT.

MODE OF OILING AND PROTECTING MILL-SPINDLES FROM DIRT.

Specification of Letters Patent No. 1,538, dated April 8, 1840.

*To all whom it may concern:*

Be it known that I, JESSE HUBBARD, of Watertown, in the county of Litchfield and State of Connecticut, have invented a new and improved mode of protecting the spindle of corn and flour and plaster mills from becoming incumbered with flour and dirt and of oiling the spindle without removing the upper millstone or any of the machinery with which it is connected; and I hereby declare the following to be a full and exact description of my invention.

My invention consists in providing a collar, which I call a protection collar, placed on and confined to the upper side of the bush, and a circular groove in the underside of the driver, fitted to and receiving the protection-collar; and of making a hole lengthwise through the damsel, the bait, and the driver to the spindle, by means of which the spindle can be oiled without removing the millstone or any of the machinery with which it is connected.

The millstones, and that part of the mill immediately connected with them, as the bush, the spindle, the driver, the bait and the damsel, are made and placed in the usual way. Then I make the protection collar of a suitable depth, say about two inches deep, and the inside of the collar large enough to allow the spindle to turn in it without causing any friction. This collar is made of cast-iron or other metal, and is placed on and confined to the upper side of the bush. My collar has a narrow rim around it, and is fastened to the bush with screws through the rim, but other modes of fastening may be adopted. In the driver, directly above the protection collar I make a circular groove, fitted to receive the collar, and into which the collar passes. This groove is so wide that no friction is caused when the driver, in which the groove is, turns, when the mill is running. The collar passing up into the groove, as before mentioned, prevents the flour and meal or dirt from getting to the spindle, and the spindle is thereby kept unincumbered with meal or dirt for a long time. Then I make a hole lengthwise through the damsel, bait and driver to the spindle, through which oil is conveyed to the spindle, without the trouble of removing the millstone or any of the machinery.

The way in which the two parts of my invention are connected aid each other, and constitute one improvement, is this: The great benefit of each is to save the trouble and expense of removing the millstone, for the purpose of cleaning or oiling the spindle, which if it had to be done for one purpose the other might be performed at the same time; but by my mode it need not be done for either.

What I claim as my invention, and desire to secure by Letters Patent, is—

The mode of protecting the spindle of the mill from meal and dirt, by means of the protection collar and groove and of oiling the spindle by means of a hole through the damsel, bait and driver as hereinbefore described.

JESSE HUBBARD.

Witnesses:
CALVIN BULTER,
TITUS H. DARROW.